United States Patent [19]

Nelson et al.

[11] Patent Number: 4,856,771

[45] Date of Patent: Aug. 15, 1989

[54] VIDEO SIMULATION APPARATUS

[75] Inventors: Darrell R. Nelson, Clearbrook; Greg W. Berg, Abbotsford, both of Canada

[73] Assignee: Nelson, Berg Enterprises, Vancouver, Canada

[21] Appl. No.: 111,070

[22] Filed: Oct. 22, 1987

[51] Int. Cl.⁴ .............................................. A63G 31/14
[52] U.S. Cl. ..................................... 272/18; 272/16; 272/36; 434/34; 434/43; 434/45; 434/58; 74/471 XY
[58] Field of Search ............................ 272/17, 18, 36; 434/43-46, 55-58, 62, 69, 34; 74/471 XY

[56] References Cited

U.S. PATENT DOCUMENTS

| | | |
|---|---|---|
| 1,342,871 | 6/1920 | Ruggles . |
| 1,393,456 | 10/1921 | Ruggles . |
| 1,402,498 | 1/1922 | Horn . |
| 1,896,175 | 2/1933 | Huffman . |
| 2,344,454 | 3/1944 | Plotner . |
| 2,409,938 | 10/1946 | Hutter . |
| 2,485,266 | 10/1949 | Edinburg . |
| 3,135,057 | 6/1964 | Nelson et al. ............... 272/36 X |
| 3,196,557 | 7/1965 | Davidsen et al. . |
| 3,542,934 | 11/1970 | Warhurst et al. ............. 272/18 X |
| 4,251,140 | 2/1981 | Fogerty, Jr. ................. 272/18 X |
| 4,303,236 | 12/1981 | Czarneki ..................... 272/18 |
| 4,461,470 | 7/1984 | Astroth et al. . |
| 4,478,407 | 10/1984 | Manabe ....................... 272/18 |
| 4,505,472 | 3/1985 | Lorenc et al. . |
| 4,710,129 | 12/1987 | Newman et al. ............. 272/18 X |

*Primary Examiner*—David A. Scherbel
*Assistant Examiner*—Richard E. Chilcot, Jr.
*Attorney, Agent, or Firm*—Oliff & Berridge

[57] ABSTRACT

A video simulation machine creates simulations of various movements, such as flying or driving. The machine has an enclosed cockpit containing movement controls and may be occupied by one or two persons. The machine can rotate 360° in any direction, thus simulating movement (simulataneous pitch, roll, and yaw) and providing the occupant or occupants with the sensations of both position and respective motion, constant, acceleration or deceleration. The monitor inside the cockpit, which displays any given simulated picture, responds through a computer to the movements of the machine via simultaneous interaction of visual, and mechanical motions. The rotating parts of the simulator are driven by electric motors, which are interactively controlled by both the operator and the computer.

31 Claims, 7 Drawing Sheets

VIDEO SIMULATION APPARATUS

BACKGROUND OF THE INVENTION

This invention relates to a video simulation apparatus operated by one or more persons seated in a simulated cockpit of an airplane or other transportation device and which provides steering and response to computer generated pictures displayed on the screen of the video monitor, positioned at the front of the cockpit. The video simulator contains a computer which displays pictures via the monitor of flight or other transportation situations or the like. In response to the person steering to control the video simulator, the video simulator can simultaneously rotate 360° in the directions of pitch, roll, and yaw in addition to ascent and descent, to provide a sense of realism to the occupants.

The terms pitch, roll and yaw are aviation terms which will be used to describe the rotational directions of the video simulation apparatus. These terms are defined hereinbelow.

These movements can further be classified as being made about one or more of three axes of rotation. These axes are called longitudinal, normal (sometimes referred to as the vertical axis) and lateral. For the purpose of describing the rotational movement of the video simulator, the longitudinal axis runs through the center of the simulator's cockpit sphere in the direction fore and aft relative to the seating. The normal or vertical axis is perpendicular to the longitudinal axis and extends in a vertical direction when the simulator is in the level flight mode; the lateral axis is perpendicular to the longitudinal axis and runs starboard and port of the seating within the cockpit. Thus, both the longitudinal lateral axes are referenced to the cockpit seating although both of these axes will change position as the cockpit seat moves. The normal or vertical axis remains affixed regardless of the cockpit seat location.

A turning maneuver rotates the simulator about the normal axis and results in rotation in the yaw direction. The simulation of climbing and diving produces rotational movement around the lateral axis which is also referred to as the pitch axis. Banking left or right rotates the simulator about the longitudinal or roll axis.

The present invention has the ability to create realism to the video simulator machine via the 360° rotational movements of pitch, roll and yaw in addition to vertical ascent and descent. A monitor is positioned at the front of the cockpit and steering devices operated by one or more persons in response to pictures displayed on the screen of the monitor, in which the cockpit is rotated in any of the pitch, roll and yaw movements, as well as ascent and descent movements, in response to the movements of the steering devices or computer interaction. This invention has measures to ensure the safety of the persons and the surrounding environment.

SUMMARY OF THE INVENTION

The present invention relates to a video simulation apparatus which is comprised of a stationary base; a rotating base mounted on the stationary base and adapted to rotate during the use of the apparatus; first mounting means intermediate the stationary base and the rotating base so as to permit the rotating base to rotate 360° on the stationary base about the normal axis; a master ring mounted rotatably within and perpendicular to the rotating base by a second mounting means, said second mounting means being adapted to allow for 360° rotation of said master ring about the longitudinal axis of the apparatus, the master ring being also adapted to receive a sphere housing which is mounted rotatably within the master ring. The sphere housing is mounted within the master ring by third mounting means such that the sphere housing will rotate 360° about the lateral axis of the video simulation apparatus. The arrangement of the sphere housing is such that the sphere housing may also rotate about the longitudinal axis through rotation of the master ring about the longitudinal axis of the video simulation apparatus. A cockpit is located within the sphere housing and has a video monitor system mounted therein to provide video graphics to the user. Control means operably by the user of the simulation apparatus is also provided to control the movement of the sphere housing and also to control movement of the view of the video monitor system. A power supply means located within the stationary base is also provided to supply power via the master ring to the video monitor systems and the control means.

The invention further relates to a video simulation apparatus comprising:
 (a) a stationary base mounted on a supporting surface and defining orthogonal longitudinal, lateral and normal axes;
 (b) a rotating base mounted on the stationary base and adapted to rotate 360° about the normal axis of said apparatus;
 (c) a master ring mounted on the rotating base and adapted to rotate 360° about the longitudinal axis of said apparatus and to rotatably support a sphere housing therein;
 (d) base carriage assemblies located intermediate and within said stationary base and said rotating base, said base carriage assembly adapted to rotatably secure said rotating base to said stationary base such that said rotating base can rotate 360° about the normal axis of said apparatus, said base carriage assembly including upper and lower base frames, said lower base frame supporting several sets of pairs of wheels, each of said wheels being affixed to said lower base frame by an adjustable wheel bracket, one of the adjustable wheel brackets being mounted to said lower base frame by a spring assembly such that each of said pair of wheels are in substantial parallel alignment with one another and are adapted to receive a base track therebetween, said base track being secured to said upper base frame, said base carriage assembly also including a pair of motors, one each to provide drive to a pair of powered wheels of said wheels mounted to said lower base frame;
 (e) master ring carriage assemblies to rotatably support said master ring within the base of said apparatus and allow for rotation of said master ring about the longitudinal axis of each of said carriage assemblies being comprised of a carriage frame supporting thereto wheels, said wheels being so arranged on said carriage frame so as to secure therebetween, on either side of said carriage frame, one of a pair of master ring tracks, said master ring tracks running substantially parallel the length of said carriage frame, each of said carriage frames being secured to said revolving base by an adjustable position frame, said adjustable position frame also being secured to the upper base frame of said base carriage assemblies, each of said master ring carriage assemblies also including a motor to generate drive to pairs of powered wheels of said wheels mounted to said carriage frame;

(f) sphere carriage assemblies adapted to rotatably support said sphere housing within said master ring and allow for rotation of said sphere housing about the lateral axis of said apparatus, each of said sphere carriage assemblies comprising a carriage frame, said carriage frame supporting wheels so arranged on each side of said carriage frame so as to secure therebetween one of a pair of sphere tracks, said sphere tracks being secured to said sphere housing, said carriage frame also supporting a motor, said motor providing drive to a pair of powered wheels of said wheels located on either side of said carriage frame;

(g) means to supply vertical lift, ascent and descent to said sphere housing;

(h) a video monitor system mounted within a cockpit located within said sphere housing; and (i) control means operable by the user to control the movement of said sphere housing said control means including a computer, a joystick control means and foot control means.

Further features and advantages of the invention will be compared to those skilled in the relevant art from the following description of a preferred embodiment of the invention read in conjunction with the appended drawings.

BRIEF DESCRIPTION OF THE DRAWINGS

In drawings which illustrate an embodiment of the invention.

DETAILED DESCRIPTION OF THE PREFERRED EMBODIMENTS

Figure 1:
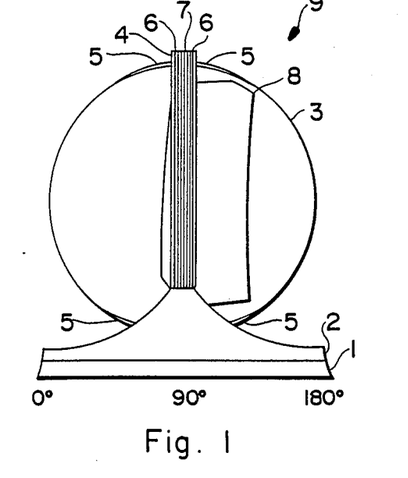
FIG. 1 is a side view of one preferred embodiment of the present invention.
Figure 4:
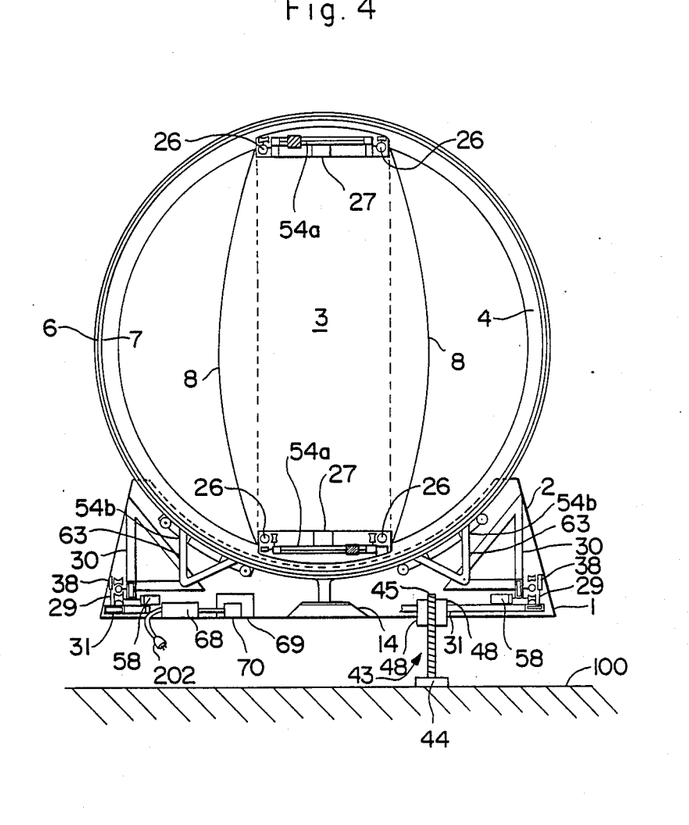
FIG. 4 is a front view in section of the preferred embodiment.
Figure 5:
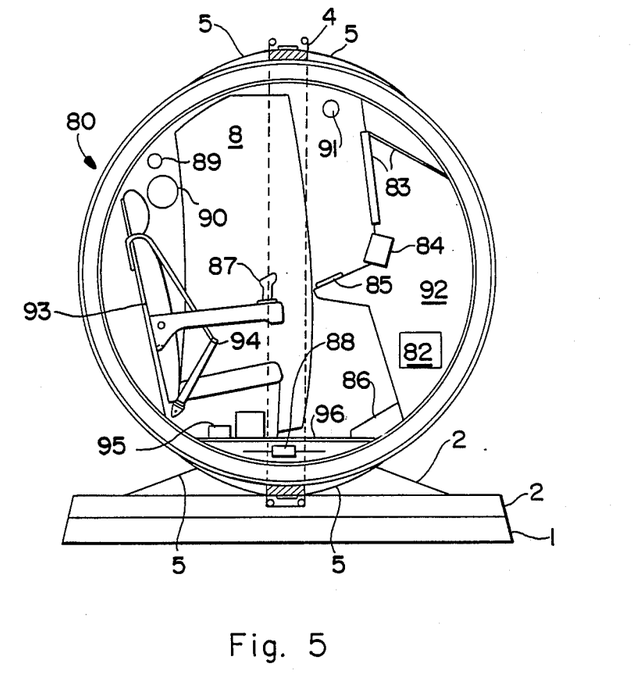
FIG. 5 is a side view in section of the preferred embodiment of the invention.

Referring to the drawings in detail the video simulator 9 of this invention includes a sphere housing 3 containing the simulated cockpit of an airplane or other transportation device 80 (see FIG. 5). Referring to FIGS. 1 and 4, the video simulator 9 is generally comprised of the following elements:

A. A stationary base 1 has a rotating base 2 mounted on it by way of a pair of base carriage assemblies 29. The base carriage assemblies attach the rotating base 2 to the stationary base 1 in such a manner that the rotating base 2 is able to rotate 360° about the normal axis during operation of the video simulator 9, and thus provides yaw movements.

B. A master ring 4 is mounted rotatably within and perpendicular to the rotating base 2 by way of a pair of master ring carriage assemblies 54b. The master ring carriage assemblies 54b attach the master ring 4 to the rotating base 2 in such a manner as to permit the master ring 4 to rotate 360° about the longitudinal axis of the apparatus.

C. The sphere housing 3 is adapted to be received inside the master ring 4. As the master ring rotates about the longitudinal axis of the video simulator, it carries the sphere housing 3 with it, thus enabling the sphere housing to rotate 360° about the longitudinal axis of the simulator, thereby providing the simulator with roll movements.

D. The sphere housing 3 is rotatably secured inside the master ring 4 by a pair of sphere carriage assemblies 54a generally similar in structure to the master ring carriage assemblies 54b. The sphere carriage assemblies 54a attach the sphere housing 3 to the master ring 4 in such a manner as to permit the sphere housing to rotate 360° about the lateral axis of the simulator, thereby providing the simulator with pitch movements.

E. A vertical lift assembly 43 is provided to raise and lower the entire simulator 9 with respect to the external surface 100 on which the simulator rests. For clarity, only one vertical lift assembly is illustrated in FIG. 4, but it is recognized that a vertical lift assembly 43 will be associated with each base carriage assembly 29 for raising or lowering the base 1 of the simulator 9.

F. A cockpit 80 (FIG. 5) is housed inside the sphere housing 3. The cockpit 80 contains the seat 93 which is occupied by the user, as well as the visual screen 83 and the controls for operating the simulator.

Figure 2:
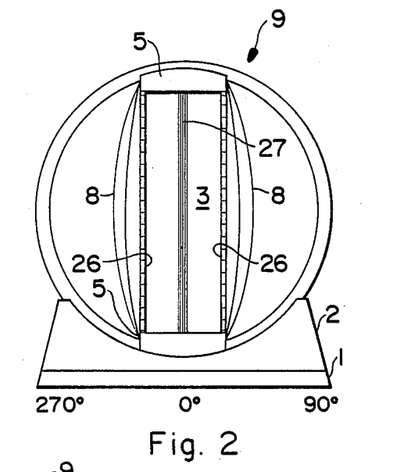
FIG. 2 is a front view of that preferred embodiment.
Figure 3:
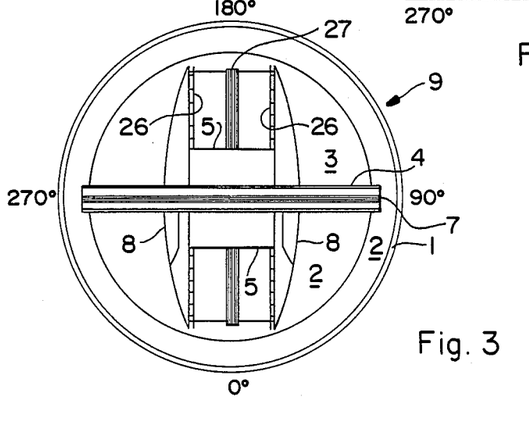
FIG. 3 is a top view of the preferred embodiment.

In greater detail the sphere 3 is positioned in the master ring 4 which is in turn positioned in rotating base frame 2. Rotating base frame 2 is positioned on base 1. Master ring 4 consists of the master ring track 6 and master ring power/signal rail 7. Track 26 and power/signal rail 27 are also included on sphere 3 (see FIG. 3). Entrance into sphere 3 is by two sliding doors 8 (see FIG. 2,3). Attached to master ring 4 is the protective cowling 5.

As illustrated in FIG. 4, sphere 3 is mounted within master ring 4 by sphere carriage assembly 54a and master ring 4 is mounted within rotating base frame 2 by master ring carriage assembly 54b. Rotating base frame 2 is positioned on base 1 by base carriage assembly 29.

The power source for the video simulator is provided by a wall plug 202 to a step down transformer 68 which transfers 110 volts electricity to the power interruption relay 70. Power is provided from the power interruption relay 70 to the base power assembly 14. The power then proceeds through power/signal rail 7 which is attached to master ring 4 and continues through the electrical transfer unit 55 (see FIG. 11) to power/signal rail 27 on sphere 3. From power/signal rail 27, power is then transferred to cockpit 80.

If the electrical power supplied to the video simulator is interrupted, then the power interruption relay disengages the main power supply circuit and hooks up with and receives 12 volt power from the emergency battery 69. When power interruption occurs, the video simulator will automatically return to the normal starting position and will remain there until proper 110 volt electricity is restored.

In the interior of sphere 3 (FIG. 5), the cockpit 80 is comprised of the following parts: The computer 81 coordinates with operator controls and thus provides command signals to control the video graphics displayed on given monitors, programs, and executes the game movements of pitch, roll, and yaw, as well as the vertical ascent and descent. Main screen monitor 82 displays the graphic pictures of the outer regions of the program. The pictures displayed on the main screen monitor 82 are projected to the larger visual screen 83. Information monitor 84 displays airplane or other transportation control instruments or the like. Control panel 85 consists of various buttons which activate various aspects of the computer program.

Foot control 86 controls the yaw movements, and joystick control 87 controls the pitch and roll rotations. The centre of gravity compensator 88 automatically positions the sphere in a balanced position, so as to reduce the wear and tear to the video simulator parts. Courtesy light 89 is a constantly lit 12 volt light. Speaker 90 provides simulated sound of airplane, other transportation device, engine noise, or the like. Emergency light 91 is a self powered light which is activated only if there should be a power interruption. Panel 92 is the housing for the control panel 85, the main screen monitor 82, the visual screen 83, and the information monitor 84.

Seat 93 is a contoured seat whereby the occupant positions himself into for the purpose of safety and comfort. Seat restraint 94 is a safety restraint which holds the occupant into the seat so as not to be flopping about when the machine is in operation. The machine will not operate unless the seat restraint is in place. Step up transformer 95 converts the 12 volt electricity back to 110 volts for the purpose of powering the computer 81 and the main screen monitor 82 and the information monitor 84. Floor 96 supports various apparatus mounted thereto and provides footing for the user.

Figure 6:
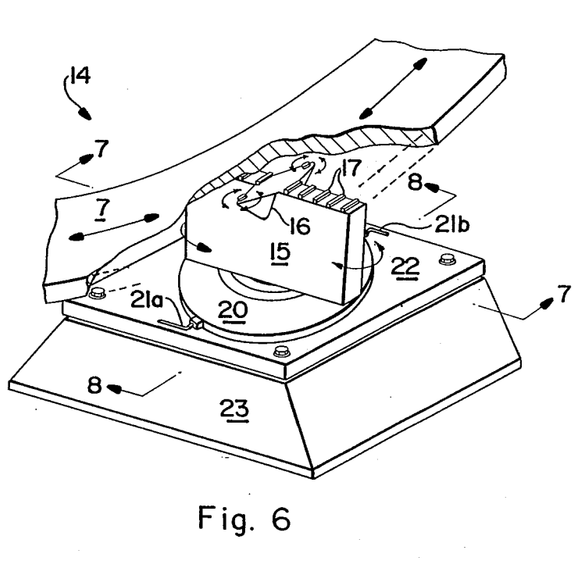
FIG. 6 is a perspective view of the base power assembly of FIG. 4.
Figure 7:
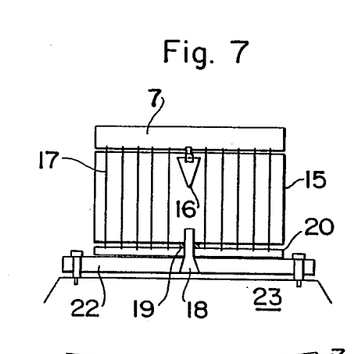
FIG. 7 is sectional view, on the scale of FIG. 6, which is taken along a plane indicated by 7—7 in FIG. 6.
Figure 8:
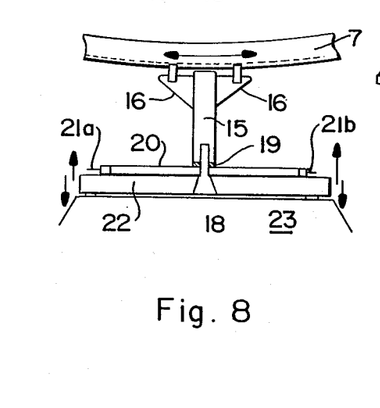
FIG. 8 is a sectional view, along the scale of FIG. 6, which is taken along a plane indicated by 8—8 in FIG. 6.

With reference to FIGS. 6, 7 and 8, the base power/signal assembly 14 is located at the center of base 1 (see FIG. 4). The electrical contact assembly 17 and contact guide 16 are located on the power/signal probe 15. The power/signal probe 15 is supported by spindle 18 (as shown in FIGS. 7 and 8) and lifted slightly by bushing 19, which is located on power signal base 20 for the purpose of allowing the electrical contact assembly 17 to make contact on the power/signal base 20. The spindle 18 is anchored to support plate 22 and protrudes through power/signal base 20. The adjustable support plate 22 is positioned on base unit 23. Power buss 21a receives power and transfers power through power/signal base 20, then through electrical contact assembly 17 and into power/signal rail 7. Signal buss 21b, sends commands from computer 81 (see FIG. 5) to the base carriage assembly 29 (FIG. 4) and vertical lift assembly 43 (FIG. 4 and FIG. 10).

Figures 9, 10:
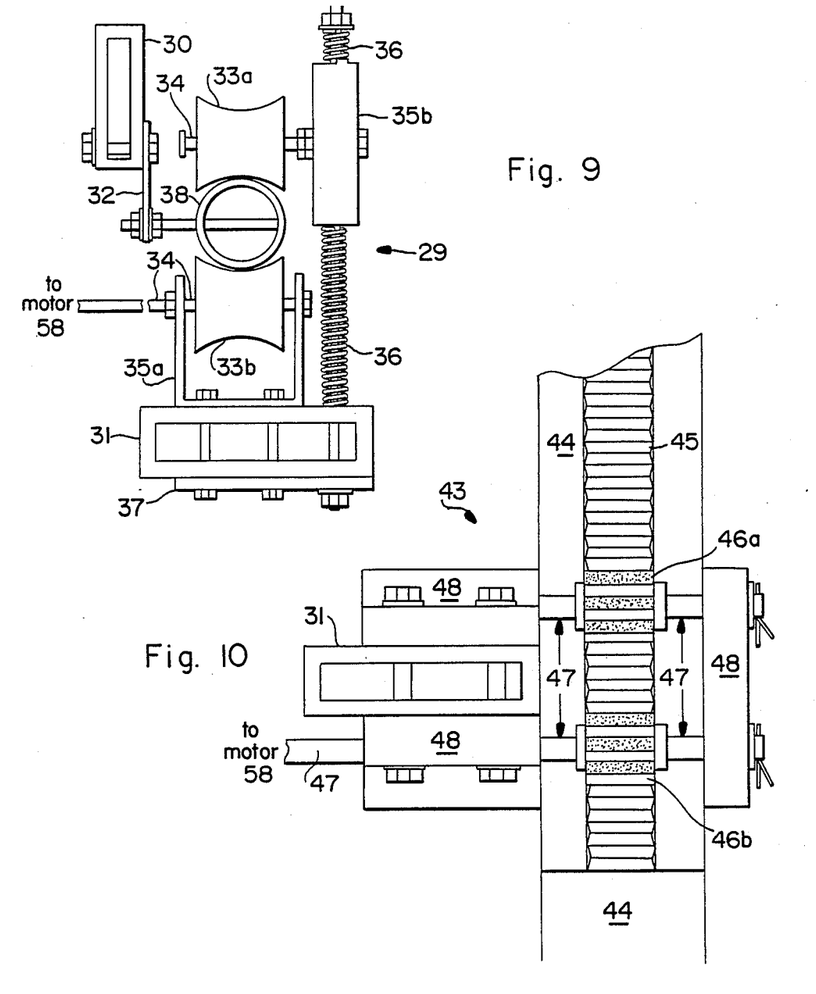
FIG. 9 is a front view of the base carriage assembly of FIG. 4.
FIG. 10 is a side view of the vertical lift assembly.

The base carriage assembly 29, shown in detail in FIG. 9, is located in base 1 (see FIG. 4). Upper base frame 30 is the frame for rotating base frame 2. Attached to upper base frame 30 is track adjuster bracket 32 which holds base track 38. Positioned on the bottom of base track 6 is powered wheel 33b, and on the top wheel 33a. These are suitably made from a hard rubber-like material such as Neoprene TM. Located through wheels 33a, 33b, is wheel axle 34. Holding wheel axle 34 in wheel 33a, is the adjustable wheel bracket 35b. The adjustable wheel bracket 35b is attached to lower base frame 31, and reinforcement plate 37 which are connected to the stationary base 1. Spring 36 located on adjustable wheel bracket 35b provides the proper tension to hold wheel 33a to base track 38. The adjustable wheel bracket 35a which holds the powered wheel axle 34, and powered wheel 33b, is attached to lower base frame 31 and reinforcement plate 37. The base carriage assembly 29 provides the video simulator with the yaw movements.

As illustrated in FIG. 10, the vertical lift assembly 43 raises or lowers the entire simulator 9 relative to the external surface 100. The vertical lift assembly operates on the rack 45 and pinion 46a, 46b application. It consists of these parts; the leg 44 attached to the lower base frame 31 of the base carriage assembly 29 and supported on the external surface 100, rack 45, pinion 46a, powered pinion 46b, pinion axle 47 and bushing guides 48. The vertical lift assembly 43 is attached to the lower base frame 31 so that relative movement between the pinions 46a, 46b and the rack 45 raises and lowers the simulator 9 relative to the surface 100. This assembly provides the video simulator with the ascent and descent movements.

Figure 11:
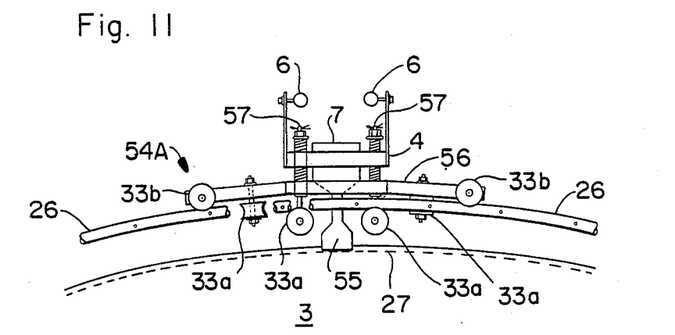
FIG. 11 is a front view of the sphere carriage assembly of FIG. 4.

The sphere carriage assemblies 54a as shown in FIG. 11, are attached to master ring 4 via the tension adjusters 57. The tension adjusters 57 are attached to carriage frame 56. Wheels 33a and powered wheel 33b are adjustable to carriage frame 56. The sphere tracks 26 (see FIG. 11) are parallel with the carriage frame 56 and are held and driven by wheels 33a and 33b. The electrical transfer unit 55 contacts between master ring power/signal rail 7 and sphere power/signal rail 27. The purpose of the sphere carriage assembly 54a is to provide stability by holding the sphere 3 into master ring 4 via the tension adjusters 57 and the sphere track 26 (FIG. 11,13) as well as provide the pitch rotations.

Figure 12:
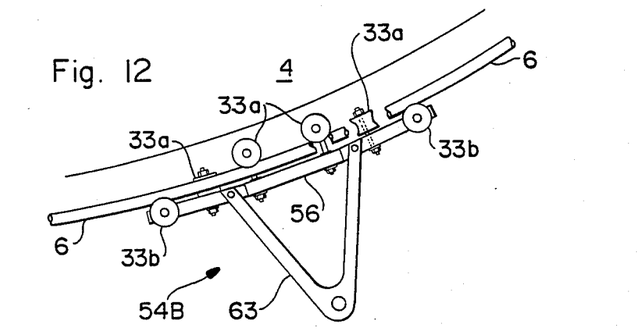
FIG. 12 is a front view of the master ring carriage assembly of FIG. 4.

The master ring carriage assembly 54b, illustrated in FIG. 12, is attached to the upper base frame 30, as shown in FIG. 4, via the adjustable position frame 63. The adjustable position frame 63 is attached to carriage frame 56. Wheels 33a and powered wheels 33b are adjustable to carriage frame 56. The master ring tracks 6 (see FIG. 13), are parallel with carriage frame 56 and are held and driven by wheels 33a and 33b. The master ring 4 is rotated by the master ring carriage assembly 54b to provide the video simulator with the roll movements.

Figure 13:
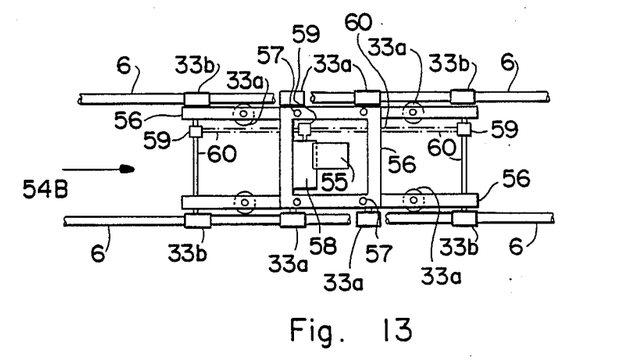
FIG. 13 is a sectional front view of the internal units of the video simulator of the present invention.

FIG. 13 is illustrative of the top view oF the sphere carriage assembly 54a. Wheels 33a and powered wheels 33b are adjustable to carriage frame 56 by the tension adjusters 57 (see FIG. 11). Master ring track 6 is parallel with carriage frame 56 and is held and driven by wheels 33a and 33b. Attached to the inside of carriage frame 56 is the motor 58 which drives the drive shafts 60 via the gear boxes 59. The sphere carriage assembly 54a illustrated in FIG. 11 is similar in construction to the master ring carriage assembly 54b illustrated in FIGS. 12 and 13 in that the carriage frame 56 of the sphere carriage assembly 54a is held and driven by wheels 33a and 33b agains sphere track 26 (see FIG. 11), while the carriage frame 56 of the master ring carriage assembly 54b is held and driven by wheels 33a and 33b against the master ring track 6 (see FIG. 13). The differences between the sphere carriage assembly 54a and 54b are the following: (1) sphere carriage assembly 54a has the electrical transfer unit 55 and master ring carriage assembly 54b does not; (2) master ring carriage assembly 54b has an adjustable position frame 63, and sphere carriage assembly 54a has the tension adjusters 57. Reference is made to FIGS. 11, 12.

The motors 58, are synchronized as to provide accuracy when the video simulator is in motion.

Figure 14:
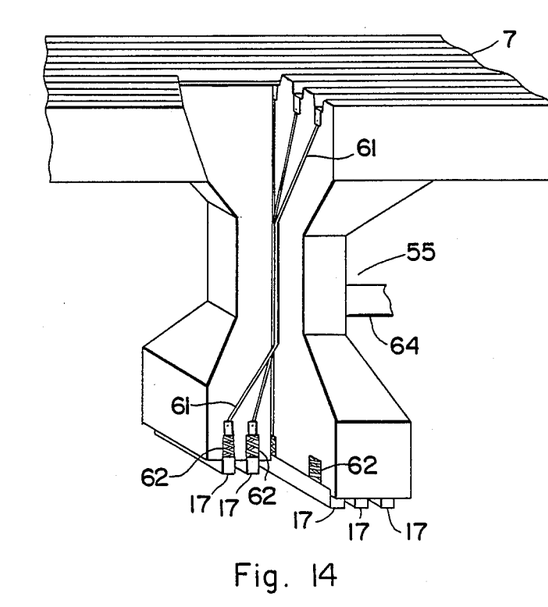
FIG. 14 is a perspective view of the electrical transfer unit.

FIG. 14 illustrates the electrical transfer unit 55. This electrical transfer unit 55 is attached to the master ring by power/signal rail 7. The power and command impulses are transferred through the electrical current wires 61 and proceed through the springs 62 and to the electrical contact assembly 17. The electrical contact assemblies 17 align with the sphere power/signal rail 27, (see FIG. 4). The buss 64 provides the motors 58 with power and command impulses from the computer 81.

MODE OF OPERATION

In operation, the Video Simulator 9 is powered via a wall plug 202. The operator opens the door 8 and climbs into the cockpit 80. He then positions himself into the seat 93. The occupant then proceeds to fasten seat restraint 94 to provide safety when seated in the cockpit 80 in preparation for simulated flight. The start button located on the control panel 85 is then pushed to activate the simulator. Once the simulator is activated the center of gravity compensator 88 positions itself to provide the video simulator with the balance needed to reduce wear and tear on the carriage assemblies 54a and 54b. The computer 81 then displays the pictures of a suitable game program through the main screen monitor 82 which is projected to the visual screen 83 and provides attitude information to the simulator. The information monitor 84 displays various flight information. The joystick control 87 and the foot control 86 also become activated so as to control the video simulator movements in flight. The joystick control 87, when pulled backward, causes the front of the sphere 3 to ascend and when pushed forward causes said front of the sphere 3 to descend. These rotational movements give the occupants the impression of pitch. The computer 81 responds to the joystick control 87 impulses of forward and backward and sends impulse commands to the motors 58 which are located in sphere carriage assemblies 54a. The motors 58 then respond to the given commands and cause the powered wheels 33b via the drive shafts 60 and gear boxes 59 to rotate the sphere 3. The joystick control 87 when positioned to the left causes the sphere 3 via the master ring 4 to rotate counterclockwise. The joystick control 87 when positioned to the right causes the sphere 3 via the master ring 4 to rotate clockwise. These movements give the occupants the impression of roll. The computer 81 responds to the joystick control 87 impulses of left and right and sends command impulses to the motors 58 which are located in master ring carriage assemblies 54b. The motors 58, then respond to the given commands and cause the powered wheels 33b via the drive shafts 60 and gear boxes 59 to rotate the master ring 4 in the roll rotations.

The foot control 86 when pushed to the left causes the rotating base frame 2 to rotate counterclockwise. When the foot control 86 is pushed to the right it causes the rotating base frame 2 to rotate clockwise. These movements give the occupants the feeling of yaw in an airplane. The computer 81 responds to these impulses and sends command impulses to the motors 58 which are located on lower base frame 31 and then respond to the given commands and cause the powered wheels 33b via the wheel axle 34 to rotate the rotating base frame 2 via the base carriage assembly 29.

The vertical lift assembly 43 is occupant controlled via the computer 81 by given buttons provided for the occupant. The computer 81 can also control vertical lift for simulated use in the computer program.

All the said movements which are controlled by the occupant, via the joystick control 87, foot control 86 and control panel 85 are synchronized with the computer pictures displayed on the main screen monitor 82. The computer 81 sound synthesizer provides airplane or other transportation device noises, or the like, through speakers 90. This enhances the realism of this machine.

When the duration of the simulation has lapsed, the video simulator will return to the normal starting position previously described in FIG. 4.

Various modifications can be made to this present invention without departing from the apparent scope thereof.

The embodiments of the invention in which an exclusive property or privilege is claimed are defined as follows:

1. A video simulation apparatus comprising:
   a stationary base mounted on a supporting surface and defining longitudinal and lateral axes, and a normal axis perpendicular to said longitudinal and lateral axes;
   a rotating base mounted on said stationary base for rotation during the use of said apparatus;
   first mounting means intermediate said stationary base and said rotating base so as to permit said rotating base to rotate 360° on said stationary base about the normal axis;
   a master ring mounted on said rotating base;
   second mounting means for mounting said master ring rotatably within and perpendicular to said rotating base, said second mounting means allowing for 360° rotation of said master ring about the longitudinal axis;
   a sphere housing received within said master ring, said sphere housing rotating about the longitudinal axis of the apparatus via said master ring;
   third mounting means for rotatably mounting said sphere housing within said master ring, said third mounting means allowing said sphere housing to rotate 360° about the lateral axis;
   a cockpit located within said sphere housing, said cockpit having a video monitor system mounted therein to provide video graphics to an operator of the apparatus;
   control means operable by the operator of said apparatus for controlling the movement of said sphere housing relative to the master ring, movement of the master ring relative to the rotating base, and movement of the rotating base relative to the stationary base, said control means additionally controlling movement of the video graphics of said video monitor system; and
   power supply means for supplying power via said master ring to said video monitor system and said control means during 360° rotation about each of said axes.

2. The video simulation apparatus as claimed in claim 1, further comprising means for returning the sphere housing to a neutral position after a predetermined period of time.

3. The video simulation apparatus as claimed in claim 1 further comprising means for returning the sphere housing to a neutral position when power for said power supply means is interrupted.

4. A video simulation apparatus as claimed in claim 1 wherein said first mounting means comprises a plurality of base carriage assemblies, said base carriage assemblies being located within said stationary base and securing said rotating base to said stationary base while permitting said rotating base to rotate on said stationary base about the normal axis; each of said base carriage assemblies including
an upper base frame supporting a base track;
a lower base frame supporting a pair of wheels, said wheels being supported in substantially parallel alignment wiht one another and being adapted to receive therebetween said base track; and
a motor to drive one of the wheels mounted on said lower base frame.

5. The video simulation apparatus as claimed in claim 4 wherein each of said wheels is affixed to said lower base frame by an adjustable wheel bracket and one of said adjustable wheel brackets is mounted to said lower base frame by a spring assembly.

6. The video simulation apparatus as claimed in claim 1 wherein said second mounting means comprises a plurality of master ring carriage assemblies for rotatably securing said master ring within said rotating base to allow said master ring to rotate about the longitudinal axis to provide roll rotation to the sphere housing.

7. A video simulation apparatus as claimed in claim 6 wherein the master ring includes a pair of master ring tracks, and each of said master ring carriage assemblies includes:
a master ring carriage frame;
a plurality of wheels affixed to said master ring carriage frame, said wheels being arranged to secure therebetween said master ring tracks so that said master ring tracks run substantially parallel to the length of said master ring carriage frame and one of said pair of master ring tracks lies on either side of said master ring carriage frame; and
a motor to drive at least one of the wheels affixed to the master ring carriage frame.

8. The video simulation apparatus as claimed in claim 6, wherein the first mounting means comprises a plurality of base carriage assemblies each of which includes an upper base frame and a lower base frame; and each of said master ring carriage frames is secured within the rotating base by an adjustable position frame secured to an upper base frame of a base carriage assembly.

9. The video simulation apparatus as claimed in claim 1 wherein said third mounting means comprises a plurality of sphere carriage assemblies, said sphere carriage assemblies rotatably securing said sphere housing within the master ring so as to allow said sphere housing to rotate about the lateral axis of the apparatus and thereby provide pitch rotation to the sphere housing.

10. The video simulation apparatus as claimed in claim 9 wherein the sphere housing includes a pair of sphere tracks, and each of said sphere carriage assemblies includes:
a sphere carriage frame;
a plurality of wheels affixed to said sphere carriage frame, said wheels being arranged so as to secure therebetween said sphere tracks so that said sphere tracks run substantially parallel to the length of said sphere carriage frame and one of said pair of sphere tracks lies on either side of said sphere carriage frame; and
a motor to drive at least one of the wheels affixed to the sphere carriage frame.

11. A video simulation apparatus as claimed in claim 10 wherein the master ring includes a master ring power/signal rail and the sphere housing includes a sphere power/signal rail, said apparatus further comprising an electrical transfer means for contacting said master ring power/signal rail and said sphere power/signal rail to transfer power from said master ring power/signal rail to said sphere power/signal rail, and to provide power to drive the motors of said sphere carriage assemblies.

12. A video simulation apparatus as claimed in claim 10 further comprising tension adjusters mounted on said sphere carriage frame, said tension adjusters providing tension between the wheels of said sphere carriage assembly and said sphere tracks.

13. The video simulation apparatus as claimed in claim 1, further comprising an ascent/descent means for raising and lowering the stationary base relative to the supporting surface.

14. The video simulation apparatus as claimed in claim 4, further comprising an ascent/descent means for raising and lowering the stationary base relative to the supporting surface.

15. The video simulation apparatus as claimed in claim 14 wherein said ascent/descent means is a vertical lift assembly affixed to the stationary base and contacting the supporting surface for raising and lowering said apparatus with respect to the supporting surface.

16. The video simulation apparatus as claimed in claim 15, wherein said vertical lift assembly is affixed to the lower base frames of the base carriage assemblies.

17. The video simulation apparatus as claimed in claim 15 wherein said vertical lift assembly is a rack and pinion mechanism.

18. The video simulation apparatus as claimed in claim 16 wherein said vertical lift assembly is a rack and pinion mechanism.

19. A video simulation apparatus comprising:
(a) a stationary base mounted on a supporting surface and defining longitudinal and lateral axes, and a normal axis perpendicular to said longitudinal and lateral axes;
(b) a rotating base mounted for rotation on said stationary base;
(c) base carriage assemblies located intermediate and within said stationary base and said rotating base, said base carriage assemblies rotatably securing said rotating base to said stationary base, such that said rotating base is able to rotate 360° about the normal axis of said apparatus; each of said base carriage assemblies including an upper base frame which supports a base track, and a lower base frame which supports sets of pairs of wheels, each of said wheels being affixed to said lower base frame by an adjustable wheel bracket, one of the adjustable wheel brackets being mounted to said lower base frame by a spring assembly such that the wheels of each of said pairs of wheels are in substantial parallel alignment with one another and are adapted to receive said base track therebetween; each of said base carriage assemblies also including a pair of motors to drive at least one of the wheels mounted to said lower base frame;

(d) a master ring mounted on said rotating base and comprising a pair of master ring tracks and a master power/signal rail;

(e) master ring carriage assemblies for rotatably securing said master ring within said rotating base such that said master ring is able to rotate 360° about the longitudinal axis of the apparatus; each of said master ring carriage assemblies including a master ring carriage frame, said master ring carriage frame supporting a plurality of wheels, said wheels being arranged on said master ring carriage frame so as to secure therebetween, on either side of said master ring carriage frame, one of said pair of master ring tracks, said master ring tracks running substantially parallel to the length of said master ring carriage frame; and each of said master ring carriage frames being secured to said rotating base by an adjustable position frame secured to the upper base frame of the base carriage assemblies, each of said master ring carriage assemblies also including a motor to drive at least one of the wheels mounted on the master ring carriage frame;

(f) a sphere housing mounted within said master ring and having mounted thereon a pair of sphere tracks and a sphere power/signal rail;

(g) sphere carriage assemblies rotatably securing said sphere housing within said master ring, such that said sphere housing is able to rotate 360° about the lateral axis of said apparatus; each of said sphere carriage assemblies including a sphere carriage frame supporting a plurality of wheels arranged on either side of said sphere carriage frame so as to secure therebetween one of said pair of sphere tracks, said sphere carriage frame also supporting a motor for driving at least one of the wheels mounted on said sphere carriage frame;

(h) a cockpit mounted within said sphere housing;

(i) a video monitor system mounted within said cockpit for displaying visual effects of flight; and (j) control means mounted within said cockpit and operable by a user for controlling the movement of said sphere housing relative to the master ring, movement of the master ring relative to the rotating base, and movement of the rotating base relative to the stationary base, said control means including a computer, a joystick control means and a foot control means.

20. The video simulation apparatus as claimed in claim 19 further comprising means for providing ascent and descent movements to said apparatus.

21. The video simulation apparatus as claimed in claim 20 wherein said means for providing ascent and descent movements is a vertical lift assembly affixed to the stationary base of the apparatus and contacting the supporting surface for raising and lowering said apparatus with respect to the supporting surface.

22. The video simulation apparatus as claimed in claim 21, wherein said vertical lift assembly is affixed to said lower base frames of said base carriage assemblies.

23. The video simulation apparatus as claimed in claim 19, further comprising a base power assembly, said base power assembly comprising:

a base unit located within the stationary base;
a support plate mounted on said base unit;
a power/signal base supported by said support plate;
a spindle anchored to said support plate and protruding through said power/signal base;
a power/signal probe supported by said spindle, said power/signal probe being elevated from the power/signal base by a bushing located on said power/signal base;
an electrical contact assembly disposed within said power/signal probe, said electrical contact assembly contacting said power/signal base via said bushing; and
a contact guide mounted on said power/signal probe, said contact guide and said electrical contact assembly being positioned to contact the master ring power/signal rail on the master ring.

24. A video simulation apparatus as claimed in claim 23 further comprising a pair of power/signal busses located on said power/signal base, said busses being connected to said base carriage assembly and said vertical lift assembly, so that said base power assembly supplies power and computer commands to said base carriage assembly.

25. The video simulation apparatus as claimed in claim 19 wherein said joystick control means is linked to the motors mounted on said sphere carriage assemblies, so that when said joystick control means is moved toward and away from the user, impulses from the computer are conveyed to said motors to drive the wheels of said sphere carriage assemblies, causing rotation of said sphere housing about the lateral axis of the apparatus.

26. The video simulation apparatus as claimed in claim 19 wherein said joystick control means is linked to the motors mounted on said master ring carriage assemblies, so that when said joystick control means is moved to the left and right of the user, impulses from the computer are conveyed to said motors to drive the wheels mounted on said master ring carriage assemblies, causing rotation of said master ring, and consequently of said sphere housing, about the longitudinal axis of the apparatus.

27. The video simulation apparatus as claimed in claim 19 wherein said foot control means is linked to the motors mounted on said base carriage assemblies, so that when said foot control means is positioned to the left and right of vertical by the user, the computer conveys impulses to said motors to drive the wheels mounted on said base carriage assemblies, causing rotation of said rotating base, and consequently of said sphere housing, about the normal axis.

28. The video simulation apparatus as claimed in claim 19 further comprising means for generating sounds of flight, means for generating sounds of weapon firing, means for flashing instrument panel lights and means for outputting said generated sounds and visual effects of flight.

29. The video simulation apparatus as claimed in claim 19 wherein said video monitor system comprises:

a computer for exerting a program;
a main screen monitor for displaying graphic pictures of the program supplied by said computer;
a visual screen to supply enlarged pictures displayed on said main screen monitor to the user;
an information monitor displaying control instruments to the user; and
a control panel having control knobs which activate various aspects of the program supplied by the computer.

30. The video simulation apparatus as claimed in claim 19 further comprising means for returning the sphere housing to a neutral position after a predetermined period of time.

31. The video simulation apparatus as claimed in claim 19 further comprising means for returning the sphere housing to a neutral position when power for said apparatus is interrupted.

* * * * *